May 14, 1940.  F. M. DALEY ET AL  2,200,262
RUBBER MOLDING AND VULCANIZING PROCESS
Filed May 18, 1936  2 Sheets-Sheet 2

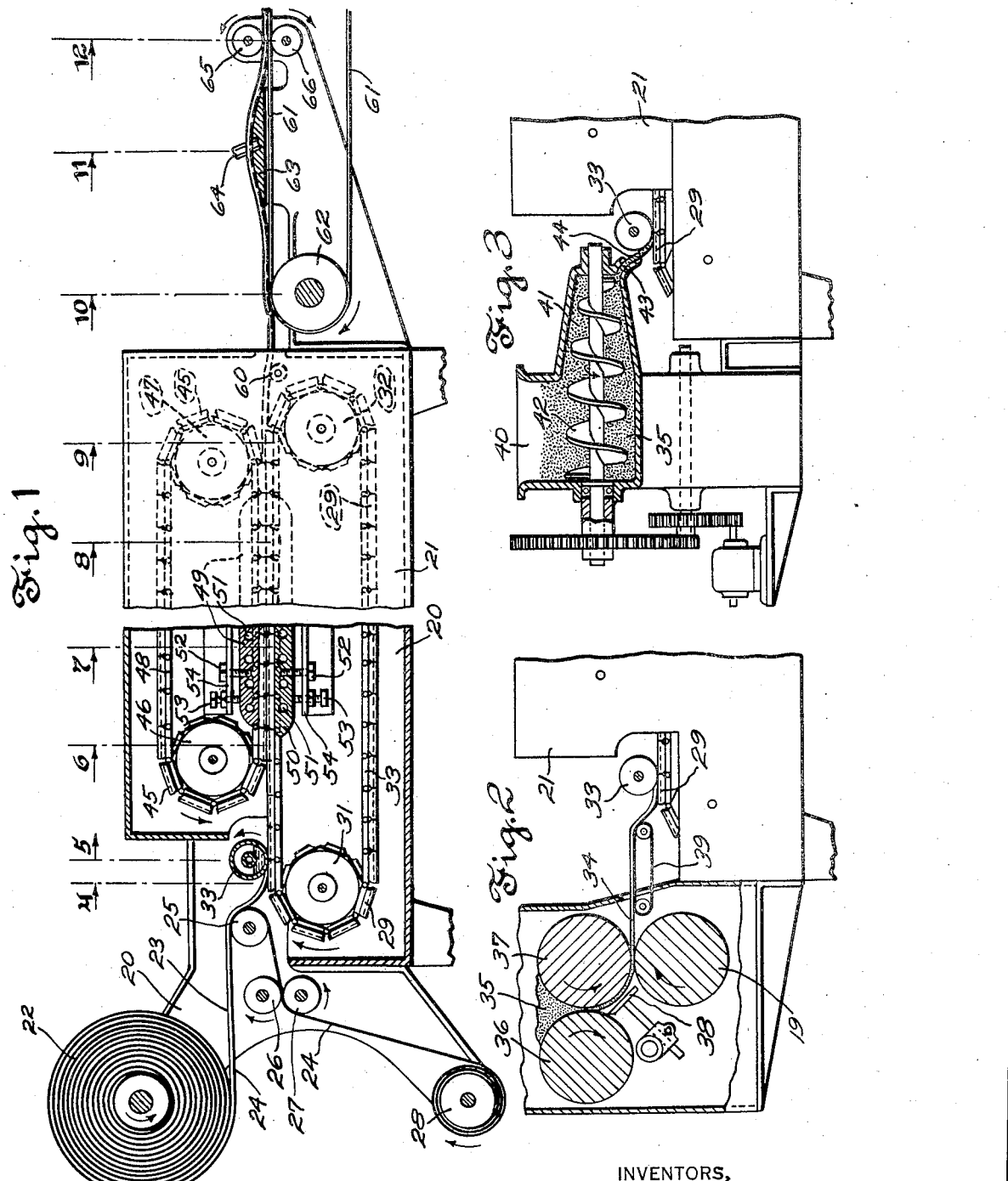

INVENTORS,
Frederick M. Daley
Ludolf H. DeWyk
BY
ATTORNEY

Patented May 14, 1940

2,200,262

UNITED STATES PATENT OFFICE 2,200,262

RUBBER MOLDING AND VULCANIZING PROCESS

Frederick M. Daley, Shelton, and Ludolf H. De Wyk, Ansonia, Conn., assignors to The Sponge Rubber Products Company, Shelton, Conn., a corporation of Connecticut Application May 18, 1936, Serial No. 80,314

10 Claims. (Cl. 18—55)

This invention relates to a new method and process for heating, molding into predetermined form, and otherwise treating vulcanizable plastic materials such as compositions containing rubber or synthetic rubber, particularly when of a mixture which swells considerably in response to heat treatment as is the case with sponge rubber compound. The invention also relates to molded and vulcanized sponge rubber products of improved characteristics resulting from this new method and process.

One object of the invention is to convert such materials into a continuous vulcanized and molded strip, or strips, the length of which is unlimited by the process which produces it and all of the surfaces of which are contoured in definitely predetermined form by direct dwelling contact with the heated wall of a rigid vulcanizing mold, which surfaces in consequence, consist of a relatively smooth and less porous skin which completely envelops the more porous inner body of the vulcanized strip if composed of sponge rubber.

A further object is to generate a product of this kind as a continuous process, permitting by its nature, continual uninterrupted travel of the material through the processing steps by which it is molded and vulcanized.

Another object is to produce in this manner from compositions containing rubber or synthetic rubber, such as sponge rubber compound, a product having the characteristics stated, which shall be uniformly vulcanized throughout its unlimited length by application to all portions of that length of the same aggregate amount of heat over the same aggregate amount of time.

A further object is continually to generate a product of the nature described by conveying a supply of composition containing synthetic rubber, or rubber, such as sponge rubber compound in continuous length through the steps of a molding and vulcanizing process without permitting it to pause in relation to a source of vulcanizing heat and without the use or accompaniment of reinforcing cores or wrappers of extraneous material.

A still further object is to produce by the above described methods a continuous strip of vulcanized material of unlimited length molded to form a plurality of adjacent longitudinal bodies of relatively great tensile strength co-extensive in length with said strip and connected laterally by a thin web which is so weak in relation to the strength of the bodies that it may easily be fractured by pulling the bodies apart thereby to split the strip into separate narrower strips consisting respectively of the longitudinal bodies.

A still further object is to apply the advantages of our improved method to the uniform vulcanization of sponge rubber compound for producing in a continuous manner in the form of joined or segregated bodies sponge rubber articles of other than strip-like proportions, such as spherical balls or cubical or cylindrical pieces.

These and other objects will be more clearly understood from the description to follow in connection with which there is illustrated in the accompanying drawings examples of various means which may be employed in carrying out our new method and process and also examples of various forms of raw material which may be employed as well as various forms of vulcanized product resulting.

In the drawings:

Fig. 1 shows certain apparatus which is but one of many possible means for controlling and treating a continuous length of unvulcanized plastic material as it passes through various steps of our improved process and is caused to undergo changes represented by Figs. 4 to 10 inclusive.

Fig. 2 illustrates a different form of unvulcanized material and apparatus for handling it, with which the process may begin.

Fig. 3 illustrates a still different form of material and apparatus with which the process may begin.

Figure 4:
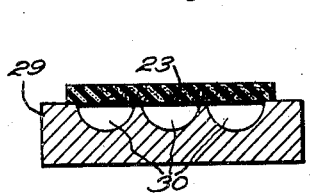
Fig. 4 is a sectional view showing, on a larger scale, the relationship of the unvulcanized material to the top surface of a supporting mold section at the stage of processing represented by vertical line 4 in Fig. 1.

In all figures of the drawings, unnumbered arrows indicate directions of travel.

While our improved process in some of its aspects lends itself not only to the molding and vulcanizing of sponge rubber compound, but with equal advantages to the molding and vulcanizing of ordinary rubber, synthetic rubbers and analogous plastic materials, it will for simplicity be described with reference to the accompanying drawings as employing sponge rubber compound as the material to be processed.

A well known characteristic of such compound is its soft and doughy consistency before vulcanization. Its first reaction to the application of heat is to become materially softer than at normal temperature so that it may even flow or spread when unconfined. Following this first reaction to heat, the compound will be caused to liberate gases within itself which causes its substance to swell, all of which effects are encountered before permanent vulcanization into a porous resilient structure takes place.

These peculiarities of behavior of this material have given rise to many problems in attempts to mold and vulcanize sponge rubber compound into a continuous length of uniformly vulcanized product when such length exceeds the feasible length of a single molding cavity. Attempts to vulcanize unlimited lengths of such material by progressively confining adjoining portions of the length in direct dwelling relationship to a source of vulcanizing heat have failed to produce a uniform degree of vulcanization throughout the length because of the uncontrolled vulcanizing effect of vagrant heat which acts upon the particular portions of the material which remain in stationary relationship to the source of heat and are just outside the confines of the mold cavity. These portions in the finished product will of necessity have been subjected to a greater aggregate amount of heat application than is the case with other portions of the length, whence uniform vulcanization becomes impossible. Uneven cross section and high cost of production also results.

Attempts to avoid this defect by conveying an unlimited length of continuous sponge rubber compound with continuous uninterrupted travel past its source of vulcanizing heat and past the heated walls of a form determining die have been defeated by the lack of sufficient tensile strength in the sponge rubber compound to keep it from pulling apart under such treatment, particularly in that stage where it becomes extremely softened by the first application of heat. Also the softened compound tends to cling to a hot metallic surface and therefore is not suited to being moved past and in bare surfaced sliding contact with a heated form determining die. Hence it has been considered necessary to reinforce the compound by means of a surrounding flexible wrapper of fabric or the like to contain it and move with it past the heated form determining walls of a stationary die. Such wrapper or facing leaves its mark upon the material or adheres firmly to it and in all cases increases the cost of production. It has also been proposed to imbed a reinforcing core within the soft body of unvulcanized rubber to provide tensile strength for drawing a length of it through a zone of vulcanizing heat. This is open to the same objections. We desire to vulcanize composition of the nature of sponge rubber compound without the use or consumption of extraneous material.

Machines making use of endless flexible belts of pervious material between which to convey sponge rubber compound into and through a zone of vulcanizing heat practice in effect only a modified form of the above described method of jacketing the compound with a flexible wrapper of fabric or the like for conveying the compound past heated rigid walls which themselves are stationary and hence incapable of traveling in unison with or serving as a mold for imparting selective shapes to the vulcanized product. On the other hand vulcanizing machines which incorporate articulated molds composed of trains of rigid jointed mold sections have offered obstacles to the vulcanization of sponge rubber compound therein which have heretofore been insurmountable for lack of any successful method of preparing and handling material of such low tensile strength and soft and adhesive nature so that it may successfully be introduced or continually fed into this kind of machine. Such material will not withstand gripping and pulling and will sag or bow into and become nipped between successive mold sections which are swinging into straight-away alignment. It moreover appears not heretofore to have been recognized that the gases to be exhausted during the "blowing" of the material can successfully escape between successive rigid impervious mold sections when the same abut so tightly as to preclude entrance of the "blowing" compound to the area of contact therebetween.

Processes for completely filling molding cavities or chambers with materials to be processed and then intermittently advancing the initially filled cavities into dwelling relation to a source of vulcanizing heat are objectionable in the vulcanizing of sponge rubber compound for reasons which have above been pointed out and further because no room is thereby left in the mold chamber for the compound to perform its necessary substantial expansion required to produce porous and highly resilient sponge rubber.

Broadly, our improved process contemplates steps differing from former methods and which may be performed in various ways but which will be described herein with reference to examples of apparatus which may conveniently be employed to perform such steps, and these steps are characterized by delivering a restricted mass of sponge rubber compound into dwelling contact with the heated surface of traveling molding chambers which are substantially larger than the mass of compound delivered thereto and are continually moving into and through a zone of vulcanizing heat. In this respect the process differs from that of molding and vulcanizing chamber-confined material in abiding relation to a source of heat and differs from that of moving the material in relation to the heated walls of a form determining die during vulcanization, and from that of loading a traveling heated molding chamber full of material which is to be vulcanized or intermittently advancing the initially filled chamber through a zone of vulcanizing heat.

Fig. 1 represents in side elevation an apparatus, the rotating parts of which may be journaled in spaced upright walls 20 and 21 and are substantially incased except for relatively small inlet and outlet passages for admitting and delivering the continuous length of material or compound to be processed. In Fig. 1 this compound is prepared in the form of a supply roll 22 of thin and relatively very wide sheet of compound 23, the layers of which when rolled may be separated by a thin fabric belt 24 commensurate in width with the sheet of compound and serving to support the weight of same between the roll 22 and a pulley roll 25. At roll 25 the fabric 24 may part from the compound 23 and be pulled toward the left between top and bottom feed rollers 26 and 27 which may be suitably powered to rotate by means not shown. A take-up drum 28 may serve to store and preserve the fabric 24 for subsequent use.

Figure 13:
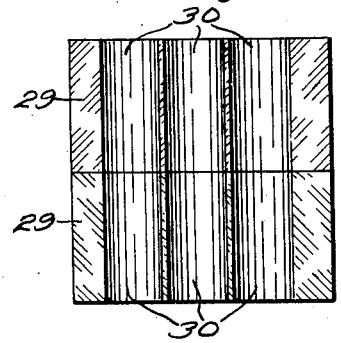
Fig. 13 is a plan view of two adjoining mold blocks like that shown in cross section in Fig. 4 and having aligned and communicating cavities in their upper faces.

After parting from the separator and carrier belt 24, the sheet compound 23 is received onto the top or molding surfaces of a train of rigid bottom walls comprising sections 29 of an articulated traveling mold at approximately the point in its travel indicated by vertical line 4 in Fig. 1. Fig. 4 shows a cross sectional view taken at this point and indicates a suitable shape and arrangement of molding cavities 30 which in end to end relation as shown in Fig. 13 may form continuous laterally adjacent grooves in the top surfaces of all mold sections 29 which are horizontally aligned in Fig. 1 between the tops of the left sprocket wheel 31 and the right sprocket wheel 32. These wheels are rotatably supported between the frame walls 20 and 21 and may be continually rotated in unison by any suitable means at such speed as will impel an endless linked belt or chain 33 with a speed of linear travel which accords with the linear travel of the sheet compound 23 as it is taken off from the roll 22. Each link of belt or chain 33 may carry a different one of the mold sections 29 which enables these sections to travel continuously in an endless procession and to be held in abutting contact as they progress from left to right in Fig. 1.

Figure 5:
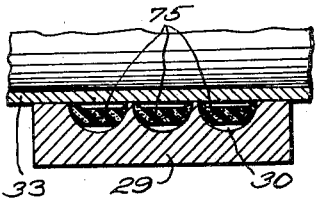
Fig. 5 shows the succeeding condition of the material at the stage in the process represented by vertical line 5 in Fig. 1.

A hollow water cooled mangle roller 33 may be continually rotated by means not shown, to have a linear surface speed equal to that of the travel of mold sections 29 and in contact with the top surfaces thereof whereby in passing between this roller and the mold sections 29, the sheet compound 23 is severed in the direction of its travel and the resulting component strips forced downwardly into the mold cavities 30 as indicated in Fig. 5. This severing step of the process takes place at the point in the travel of the sheet compound 23 indicated by the vertical line 5 in Fig. 1 and from this point the compound continues to travel toward the right in the form of separate strips respectively lodged in the endwise aligned cavities 30 as continuous charges of compound which are to be molded and vulcanized.

Fig. 2 indicates a method by which a shapeless and unlimited supply of sponge rubber compound or analogous material may continually be converted into the form of a continuously traveling sheet 34 as a step in the process contemporaneous with the subsequent processing treatment of the sheet. The unlimited supply of shapeless compound is indicated at 35 and it is continually drawn downwardly in a continuous mass of restricted thickness and width by the action of drums 36 and 37 rotating in the directions of the arrows respectively marked thereon. An adjustable scraper guide 38 will assist in the control of the mass of compound withdrawn from the supply 35 which is finally delivered toward the right from between the drums 37 and 19 to the support of an endless carrier belt 39 in the form of the continuous sheet 34 which proceeds to its point of severance between roller 33 and the train of mold blocks 29 as in the case of the sheet of compound 23 in Fig. 1.

Fig. 3 indicates still another contemporaneous process for converting an unlimited supply of the compound into suitable form to be received by the mold grooves 30. Shapeless compound in the hopper 40 descends to the level of the extrusion chamber 41 in which helically finned extrusion screw 42 rotates and constantly forces the compound toward the right. A single suitably shaped lipped opening 43 may be given a shape that will cause the compound 35 to be extruded therethrough in the form of a wide and thin sheet 44 similar to the sheets 23 and 34 of Figs. 1 and 2 respectively which may thus be delivered to the mold blocks 29 and severed by the roller 33 in the manner heretofore described. This method of delivering a continually fed restricted mass of the compound lends itself to dispensing with the severing roller 33 as the extrusion orifice 43 may be divided into a row of separate orifices each of proper size to deliver respectively to each of the mold cavities 30 a separate strip of the compound like the separate strips shown in cross section in Fig. 5 instead of a continuous width of sheet compound requiring to be severed.

All of the above described methods of preparing and feeding strips of sponge rubber compound respectively delivered to mold cavities 30 will be recognized as steps for continually controlling and restricting the volumetric size of the compound delivered to the cavities to a mass smaller than the size of the chamber in which it is to be molded and vulcanized and the next step in the process consists in completing the enclosure of the delivered compound to confine it within its molding chamber.

This takes place at the point in the travel of the unvulcanized compound indicated by the vertical line 6 in Fig. 1. A corresponding endless train of rigid upper block sections 45 forming an articulated closure for roofing over the mold sections 29 is supported by the sprocket wheel 46 and sprocket wheel 47 which serve to impel the link belt or chain 48 and the upper mold blocks 45 respectively carried by the links thereof with a linear speed equal to that of the travel of the lower mold blocks 29. As the upper and lower mold blocks come into contact they form an enclosing chamber for the traveling compound as shown in Fig. 6 and their cavity containing surfaces register and align the cavities and thus ride in contact or slightly apart as adjustably determined by the vertical spacing of an upper heater plate 49 and a lower heater plate 50, both of which plates may contain passages or conduits furnished with steam as the source of heat or be equipped with or associated with gas burners, electric heating units, or any equivalent thereof, for providing a zone of heat sufficient to vulcanize the mold contained compound.

The steam passages illustrated are indicated at 51 in Fig. 1 and the spacing of the heater plates may be determined by suitable adjustment of pull screws 52 having threaded engagement with the heater plates and push screws 53 having threaded engagement with the flange 54 of a frame carried bracket. The traveling mold blocks 29 and 45 are thus heated by the adjustable heater plates 49 and 50.

It is not necessary that the traveling upper and lower mold block sections be given actual sliding contact with the surfaces of their heater plates since adjustably spaceable track rollers may be introduced and carried by the frame, against which rollers the mold sections, or the link belts or chains which carry them, may ride in a well known manner. The upper and lower mold sections may thus be constrained by said rollers to travel in controlled proximity or in actual contact with one another while sufficiently near the heater plates to be heated to a vulcanizing temperature.

Figure 6:
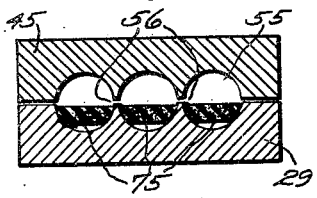
Fig. 6 shows the imprisoned condition of the material at the stage in the process indicated by vertical line 6 in Fig. 1.
Figure 7:
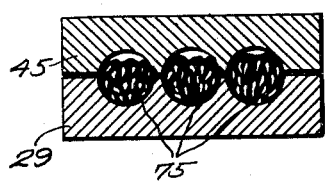
Fig. 7 shows the expanding condition of the material at the stage in the process indicated by vertical line 7 in Fig. 1.
Figure 8:
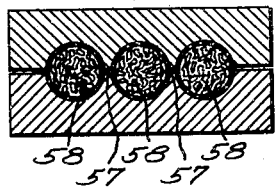
Fig. 8 represents the fully vulcanized condition of the material at the stage in the process indicated by vertical line 8 in Fig. 1.

As the chamber closeting mold sections 29 and 45 continue their travel from left to right in Fig. 1 in proximity to the heater plates, the confined rubber compound becomes heated and begins to liberate gases within and from itself which causes its substance to swell or expand from its condition represented in Fig. 6 to a condition roughly represented in Fig. 7 and this action continues until the compound has completely filled its chamber in the mold if a properly sized mass of the proper composition has initially been delivered to the mold cavities while excess gases find vent outward from each mold section past and between the adjoining ends of the mold sections in each articulated train. The compound expands from its stage in Fig. 6 to its stage as in Fig. 7 in the presence of sufficient empty space to allow some of the gases to travel oppositely to the direction of travel of the mold sections and thereby issue from the mold chamber where the mold sections first come together at about the point indicated by the vertical line 6 in Fig. 1. As the expansion of the compound continues it is ultimately limited by the size of the mold chamber and if the upper and lower mold sections fail to abut against each other or to maintain absolute contact in their contiguous portions separating the cavities 30 in section 29 and separating the cavities 55 in section 45, the expanding compound in the separate cavities will force its way through the cracks 56 thereby provided and become reunited or interconnected by a thin web 57 of the rubber compound before it attains a fully vulcanized condition. Fig. 8 shows this to have happened at some stage in the process between the points in the travel of the material arbitrarily indicated by the vertical lines 7 and 8 in Fig. 1 and further represents the sponge rubber bodies 58 fully vulcanized in accurate conformity with their respective chambers and connected by the thin webs 57 of the vulcanized rubber.

Figure 9:
Fig. 9 shows the vulcanized product in Fig. 8 released by removal of the upper mold section as is the condition at the stage in the process indicated by vertical line 9 in Fig. 1.

Vulcanization now being completed, the resulting single piece strip represented by 59 in Fig. 9 is released from confinement by the upper mold sections 29 progressively and gradually as the latter begin their upward travel about the periphery of wheel 47 at the stage in the process represented by the vertical line 9 in Fig. 1.

In the processing steps which have been described, it will be clear that no portion of the length of the continuous traveling material is subjected to any different application of heat either in terms of the intensity of heat or duration of time than is any other portion of the material, whereby truly uniform vulcanization of unlimited length of a rubber product is truly accomplished while an expanding compound is confined within oversize chambers whose walls are rigid and preferably of metal so that there is imparted to the vulcanized product a definite body shape and a contour and marking of all its surfaces, conforming finally to the surfaces of the mold with which it dwells in contact while being vulcanized.

Figure 11:
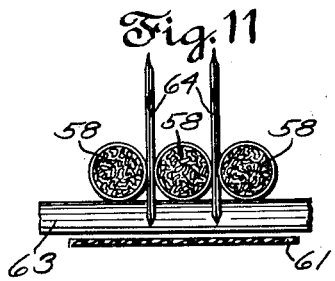
Fig. 11 shows the material at its point of longitudinal severance indicated by the vertical line 11 in Fig. 1.
Figure 12:
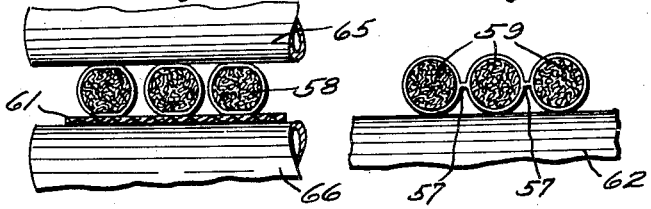
Fig. 12 represents the severed lengths of material at the point where they are drawn forwardly by feed rollers to be delivered from the process, this action occurring at the stage indicated by the vertical line 12 in Fig. 1.
Figure 10:
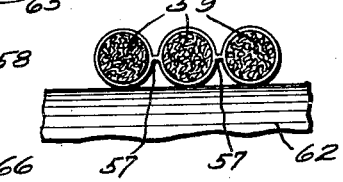
Fig. 10 shows the vulcanized strip of Fig. 9 delivered from the cavities in the lower mold section to conveyance by an endless belt at the stage in the process indicated by the vertical line 10 in Fig. 1.

The continuous length of vulcanized strip-like sponge rubber may then be transported over one or more rotatable support rollers 60 to assist its departure from contact with the mold sections and onto an endless traveling belt 61 only one of whose supporting pulleys is shown at 62. Just above the surface of the belt the sides of the machine frame may be bridged by a stationary platform 63 on which may be mounted a crosswise extending row of suitable knives or cutters of any appropriate form one of which is indicated at 64 in Fig. 1 as an ordinary double edged blade of a safety razor preferably inclined at its top toward the approaching vulcanized strip. These cutters may be spaced to register with the connecting webs 57 of the sponge rubber strip 59 so that as the strip is continually pulled toward the right by cooperative rotation of the upper feed roller 65 and lower feed roller 66, the webs 57 will progressively be severed, thus as a continuous process dividing the single piece strip 59 into separate narrower strips as indicated in Figs. 11 and 12 all of which may be somewhat squeezed between the upper feed roller 65 and the conveyer belt 61 at the point where the lower feed roller 66 rotatively supports belt 61 as it travels.

Figure 14:
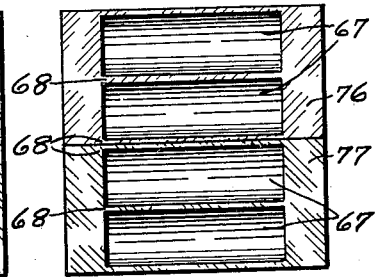
Fig. 14 shows a modified arrangement of mold cavities in adjoining blocks otherwise like those of Fig. 13.

The complete process has now been described whereby the restrictively fed masses 75 of sponge rubber compound are continually delivered into direct dwelling contact with the cavity surface of oversized molding chambers and while confined thereby subjected to a vulcanizing heat without dwelling in relation to the source of such heat. These characteristics of our improved process may be availed of to equal advantage if the cavities in the mold sections 76 and 77 are disposed in the arrangement indicated by the cavities 67 in Fig. 14. In this arrangement a continuous length of vulcanized strip will result if cavities 67 are permitted to communicate with one another through a narrow or substantial space between the contiguous cavity separating portions 68 of the upper and lower mold sections 76 and 77, or if preferred, the continuous lengthwise chamber thus formed by these mold sections may be of uniform cross sectional size and shape throughout its length from the wheel 46 to the wheel 47 whereupon an unlimited length of vulcanized sponge rubber will be produced which is of uniform cross section in all portions of that length and characterized by a definite surface configuration because vulcanized throughout in dwelling contact with rigid heated mold surfaces.

Figure 16:
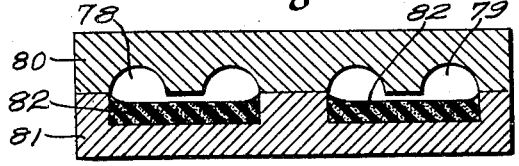
Fig. 16 is a cross sectional view through material confining upper and lower mold sections at a stage in the process similar to that represented by Fig. 6 showing a modified cross sectional shape of mold cavities.

Fig. 16 indicates a fanciful cross sectional shape which may be given to widely separated lengthwise continuous cavities 78 and 79 in a common mold block comprised of the sections 80 and 81 for generating two separate continuous lengths of vulcanized product of cross sectional shape corresponding to the cavities and shows the material 82 as it might appear if viewed in cross section at the stage in the process represented by the vertical line 6 in Fig. 1.

Figure 15:
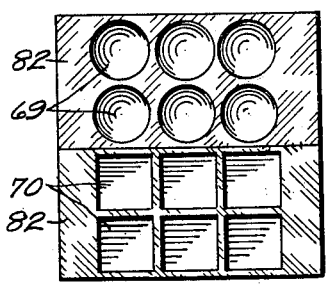
Fig. 15 shows still different arrangements of mold cavities in adjoining blocks otherwise like those of Figs. 13 and 14.

Fig. 15 shows differing shapes of cavities which may have the same respective size and shape both in the upper surface of the lower mold section 82 and in the lower surface of the upper mold section (not shown) and be positioned to register, thereby to form closed chambers after there has been delivered to the lower cavities suitable masses of sponge rubber compound substantially smaller than the size of the chamber, for vulcanizing such masses into molded separate articles such as balls or blocks of sponge rubber. If any or all of the spherical cavities 69 and the cubical cavities 70 are given communication by space between the mold surfaces when the latter are brought together to form a confining chamber, the resulting vulcanized rubber bodies will be produced in web connected form, whereas if the planar mold surfaces abut closely together the resulting product will be separate articles. Suitably restricted masses of sponge rubber compound may be delivered to cavities 69 and 70 by the feeding of a continuous sheet as in Figs. 1, 2 and 3, or separate pellets of compound of undersized mass may individually be dropped into each of the cavities of Figs. 13, 14 and 15, as they move successively past the points represented by vertical lines 4 or 5 in Fig. 1. Such pellets may be delivered by hand or may be punched out of sheet compound into the cavities as each cavity arrives at and passes the punching station, or they may intermittently be extruded through a row of orifices at 43 in Fig. 3.

A continuous strip of vulcanized rubber consisting of the parallel longitudinal bodies 58 connected by a thin web 57 is characterized by such weakness of the web relative to the strength of the bodies that the web alone may fracture when the bodies are pulled apart without previous cutting of the web. For large volume production at low unit cost, as many of the bodies 58 as is desired may be simultaneously generated as separate strips or in side by side web-connected relationship. Thus a vulcanized sponge rubber product consisting of forty or more web connected parallel and longitudinal bodies may be continually generated by our improved process.

It is equally clear that there need be no limit to the length of the strip which may be undergoing heat treatment at a given time inasmuch as the wheels 31 and 46 may be separated respectively from the wheels 32 and 47 to increase the number of upper and lower mold sections which are traveling through their zone of heat to any desired quantity so that the advantages of a relatively low temperature applied to the material for a relatively long period of time becomes possible where the nature of the compound makes it best vulcanized with this relation of temperature and time, or where the desired linear rate of production of the vulcanized product is required to be speeded up for increasing the daily output.

The steps which comprise our improved process involve principles of treatment which are not dependent upon the particular type of apparatus herein illustrated to exemplify the process. For instance, the severing roller 33 may in some cases be omitted and the mere closing of the mold sections relied upon to grasp and advance some portions of the compound sheet 23 and to confine other portions within their respective vulcanizing chambers. This is true of all of the forms of cavities illustrated in Figs. 13 to 16 inclusive. Where only a single strip or each of a series of independent strips of compound is played off alone or side by side respectively into a single traveling cavity or into each of a series of adjacent traveling cavities, as for instance by the extruding method hereinbefore explained, of course no severing or dividing step is necessary at the point of travel of the material indicated by vertical line 5 in Fig. 1.

The shapes of the mold cavities and of the chambers which they combine to form, may vary to suit the purposes of the product and the invention will be understood to reside in our process which has been described without limitation to any of the particular materials or apparatus which have been referred to in the disclosure hereof.

We claim:

1. The process of converting a plurality of separate strips of expandable unvulcanized material into an integral vulcanized sheet of unlimited length which includes the steps of continually conveying said plurality of separate strips simultaneously at equal speed in the direction of their length in spaced and parallel respective paths of travel in the presence of sufficient heat to soften the material of adjacent strips and cause the same to spread and unite while the strips are being conveyed, and then conveying the united material in the presence of sufficient heat to fully vulcanize the same in the form of an integral sheet while the united material is being conveyed.

2. The process of continually converting a continuous sheet of sponge rubber compound into a plurality of normally straight continuous bodies of uniformly vulcanized sponge rubber free from extraneous material and of unlimited length, which includes the steps of continually withdrawing a continuous length of said sheet of compound from a source of supply thereof and advancing the same constantly toward a zone of heat, progressively dividing said sheet of compound into adjacent traveling strips, progressively imprisoning said strips of compound within rigidly walled molding chambers of fixed shape and cross-sectional size substantially larger than the cross-sectional size of the strips respectively imprisoned therein, and moving the chamber imprisoned strips simultaneously through a zone of vulcanizing heat in a straight line of travel.

3. The process of continually converting a continuous supply of sponge rubber compound into a normally straight continuous sheet of uniformly vulcanized sponge rubber, of unlimited length, and of fully predetermined surface configuration, which includes the steps of continually withdrawing a continuous body of said compound from said supply and advancing the same constantly toward a zone of heat, progressively dividing said continuous body of compound into adjacent traveling strips, progressively imprisoning said strips of compound within rigidly walled adjacent communicating chambers of fixed shape and of cross-sectional size substantially larger than the cross-sectional size of the strips respectively imprisoned therein, moving the chamber imprisoned strips in unison with the chamber walls simultaneously and in straight paths of travel through a zone of heat sufficient to melt the compound in adjacent communicating chambers and cause it to expand and reunite, and further moving the chamber imprisoned and reunited compound of the strips in straight paths through a zone of sufficient heat to vulcanize the reunited compound of the strips into an integral sheet of sponge rubber having a surface configuration conforming throughout to the walls of said chambers.

4. A continuous process for progressively vulcanizing an unlimited length of sponge rubber compound while traveling, which includes the steps of calendering said compound, conveying said calendered compound toward a zone of heat by supporting the same upon a moving carrier, playing off said compound from said carirer in a downward direction, squeezing said compound progressively against a traveling support in a manner to divide the compound into separate bodies, conveying said bodies of compound in unison with one another and with said traveling support into said zone of heat, melting, expanding and reuniting the compound of said bodies during continuous travel of the latter in said heat zone, and vulcanizing the reunited compound of said bodies into an integral article of sponge rubber during travel of said reunited compound through said zone of heat.

5. The method of feeding progressively into a processing station an unlimited length of sponge rubber compound and severing the same into separate bodies of said compound, which includes the step of dividing said length of compound progressively by squeezing the same between a relatively cool surface moving in contact with a relatively warm recessed surface thereby to cause said bodies of severed compound to leave said cool surface and adhere to and travel with said recessed warm surface into the processing station.

6. The process of continually converting a continuous sheet of sponge rubber compound into a plurality of continuous bodies of uniformly vulcanized sponge rubber, which includes the steps of continually withdrawing a continuous length of said sheet of compound from a source of supply thereof and advancing the same constantly toward a zone of heat, scoring and squeezing said sheet of compound progressively along adjacent lines and into adhering contact with a traveling support surface in a manner to form strip-like bodies extending side by side in the direction of said travel and to cause said bodies of compound to travel in unison with said support into said zone of heat, progressively imprisoning said bodies of compound within rigidly walled molding chambers of fixed shape and cross sectional size substantially larger than the girth of said bodies respectively imprisoned therein, and moving the chamber imprisoned bodies simultaneously through a zone of vulcanizing heat.

7. The process of converting sponge rubber compound into uniformly vulcanized sponge rubber which includes the steps of withdrawing said compound from a source of supply thereof, progressively placing said compound on the exposed bottom molding wall of an open traveling rigid mold section in a manner to cause said compound to travel in unison with said mold, thereafter progressively closing said mold with a rigid closure to form a molding chamber of fixed cross sectional shape and greater volumetric capacity than the volume of the compound placed therein and to enclose the compound in the mold, and moving the mold and compound through a zone of vulcanizing heat to expand the compound to fill the mold and vulcanize the compound.

8. The process of converting a bulk supply of sponge rubber compound into a uniformly vulcanized cellular rubber article of uniform density, which includes the steps of progressively withdrawing said compound from a source of supply thereof, controlling the rate of withdrawal of said compound to predetermine the volume thereof progressively withdrawn from said source of supply, progressively placing said predetermined volume of compound on the exposed bottom molding wall of an open traveling rigid mold section in a manner to cause said compound to travel in unison with the mold, thereafter progressively closing said mold with a rigid closure to form a mold chamber of fixed cross sectional shape and greater volumetric capacity than said predetermined volume of the compound placed therein thereby to enclose the compound together with a volume of empty space definitely proportioned to said volume of compound in the mold, and moving the mold and the compound in the presence of said space through a zone of vulcanizing heat to expand the compound to a volumetric extent equal to the volume of said empty space thereby to fill the mold with said compound and vulcanize the latter in all-over surface conformity with the said rigid bottom molding wall and rigid closure.

9. The process of converting sponge rubber compound into uniformly vulcanized sponge rubber which includes the steps of withdrawing said compound from a source of supply thereof, progressively placing said compound in an exposed cavity contained in the upper face of the bottom rigid molding wall of an open traveling mold section in a manner to cause said compound to travel in unison with the mold, thereafter progressively roofing over said mold cavity with a rigid closure in a manner to complete a mold chamber of fixed cross sectional shape and volumetric capacity equal to that of the combined volume of the compound placed therein and a volume of excess space for the expansion thereof thereby to immure the compound in the presence of said excess space within said chamber, and moving said mold compound and space through a zone of vulcanizing heat to expand the compound to occupy said space thereby to fill the mold with said compound and vulcanize the latter in all-over surface conformity with the said rigid bottom molding wall and rigid closure.

10. The process of converting sponge rubber compound into uniformly vulcanized sponge rubber which includes the steps of withdrawing said compound from a source of supply thereof in the form of a supported strip of said compound traveling in the direction of its length, progressively playing off said strip of compound from its means of support in a manner to suspend said strip downwardly and slackly through space and deposit it progressively on the bottom molding wall of a traveling rigid mold section in a manner to cause said strip of compound to travel in unison with said mold, thereafter progressively closing said mold with a rigid closure to form a mold chamber of fixed cross sectional shape and greater cross sectional area than that of the strip of compound placed therein and to encompass the strip of compound in the mold, and moving the mold and strip of compound through a zone of vulcanizing heat to expand the compound to fill the mold and vulcanize the compound.

FREDERICK M. DALEY.
LUDOLF H. DE WYK.